United States Patent [19]

Furihata et al.

[11] Patent Number: 5,310,789
[45] Date of Patent: May 10, 1994

[54] VINYL HALIDE RESIN WITH EPOXY RESIN AND POLYAMINE

[75] Inventors: Toshikazu Furihata; Toru Tomoshige, both of Ichihara, Japan

[73] Assignee: Mitsui Petrochemical Industries, Ltd., Tokyo, Japan

[21] Appl. No.: 44,773

[22] Filed: Apr. 12, 1993

Related U.S. Application Data

[60] Division of Ser. No. 959,479, Oct. 9, 1992, abandoned, which is a continuation of Ser. No. 569,586, Aug. 20, 1990, abandoned, which is a continuation of Ser. No. 292,391, Dec. 30, 1988, abandoned.

[30] Foreign Application Priority Data

Jan. 6, 1988 [JP] Japan ................................. 63-307
Jan. 6, 1988 [JP] Japan ................................. 63-308

[51] Int. Cl.$^5$ .................... C08L 63/02; C08L 63/04
[52] U.S. Cl. ........................................ 525/58; 525/113
[58] Field of Search ................................. 525/113, 58

[56] References Cited

U.S. PATENT DOCUMENTS

4,528,308  7/1985  Waddill .................. 525/113

FOREIGN PATENT DOCUMENTS

0590460  1/1960  Canada ...................... 525/113
48-6934  3/1973  Japan ......................... 525/113
0991905  5/1965  United Kingdom ...... 525/113

*Primary Examiner*—Robert E. Sellers
*Attorney, Agent, or Firm*—Sherman and Shalloway

[57] ABSTRACT

An adhesive composition for a vinyl halide resin is disclosed. This adhesive composition is formed by incorporating an aliphatic polyamine having a plurality or ether bonds, an alicyclic polyamine or an alkylene diamine into a blend of an epoxy resin and a vinyl chloride copolymer resin. This adhesive composition is effectively used in the solvent-free state for a molded body of a vinyl halide type resin such as a vinyl chloride resin or a vinylidene halide resin.

9 Claims, No Drawings

VINYL HALIDE RESIN WITH EPOXY RESIN AND POLYAMINE

This is a division of application Ser. No. 07/959,479 filed Oct. 9, 1992, now abandoned; which is a continuation of application Ser. No. 07/569,586, filed Aug. 20, 1990, now abandoned; which is a continuation of application Ser. No. 07/292,391, filed Dec. 30, 1988, now abandoned.

BACKGROUND OF THE INVENTION (1) Field or the Invention

The present invention relates to an adhesive composition for a vinyl halide type resin such as a vinyl chloride resin or a vinylidene chloride resin.

(2) Description of the Related Art

A vinyl halide type resin such as a vinyl chloride resin is widely used in various fields as rigid products such as telephone cards, cash cards, IC cards, records, various plates and pipes and as soft articles such as agricultural films, electric wire coverings and furniture leathers.

These vinyl chloride resins are used in the state laminated with or bonded to other resins or paper according to intended uses as mentioned above. Practically, however, bonding methods for laminating or bonding resins of this type involve problems.

The following methods are often adopted as the bonding means.

(1) A method in which an adhesive of a solution type formed by dissolving a vinyl chloride/vinyl acetate copolymer resin, an acrylic acid ester copolymer, a copolycondensed polyester resin or a thermoplastic polyurethane resin in a solvent is used.

(2) A method in which the surface of a vinyl chloride resin as an adherend is dissolved and bonding is effected before complete scattering of the solvent.

(3) A method in which a dope cement (formed by dissolving a vinyl chloride resin in a solvent) is used for bonding.

In any or the foregoing methods, since a solvent is used, problems arise because whitening, embrittlement and cracking of the vinyl chloride resin are readily caused.

As the means for obviating this disadvantage, use of a solvent-free adhesive such as a solvent-free epoxy resin, a solvent-free reactive acrylic resin or a solvent-free polyurethane adhesive has been proposed. However, since large amounts of a plasticizer, a stabilizer, an antistatic agent and the like are contained in a vinyl chloride resin, a satisfactory bonding strength cannot be obtained by any of these adhesives.

SUMMARY OF THE INVENTION

We made research on solvent-free adhesive compositions and as the result, it was found that an adhesive composition comprising an epoxy resin and a vinyl chloride copolymer resin as main components and a curing agent component selected from an aliphatic polyamine having a plurality or ether bonds, an alicyclic polyamine and an alkylene diamine has an excellent adhesiveness to a vinyl halide type resin such as a vinyl chloride resin. We have now completed the present invention based on this finding.

More specifically, in accordance with the present invention, there is provided an adhesive composition for a vinyl halide type resin, which comprises (a) an epoxy resin, (b) a vinyl chloride copolymer resin and (c) a curing agent component selected from the group consisting of aliphatic polyamines having a plurality of ether bonds, alicyclic polyamines and alkylene diamines.

DETAILED DESCRIPTION OF THE INVENTION

In the adhesive composition of the present invention, the epoxy resin as the component (a) and the vinyl chloride copolymer resin as the component (b) are adhesive components, and especially, the vinyl chloride copolymer resin as the component (b) acts as a surface active agent and improves the affinity of the epoxy resin as the component (a) with the surface of a vinyl halide type resin, that is, an adherend.

If a specific polyamine compound as the component (c) is incorporated as the curing agent into the combination of the components (a) and (b), an adhesive composition having a high bonding strength, as shown in examples shown below, is obtained.

For example, the T-peel bonding strength or a bonded structure constructed by using the adhesive composition of the present invention is higher than 1.0 kgf/cm, while the T-peel strength of a bonded structure constructed by using a comparative adhesive composition is as low as about 0.1 to about 0.3 kgf/cm.

Moreover, the adhesive composition of the present invention can be cured at a temperature lower than the glass transition point (Tg) of a rigid vinyl chloride resin, and the adhesive composition of the present invention is advantageous in that bonding can be accomplished even at a temperature not causing deformation in the adherend.

The respective components of the adhesive composition of the present invention will now be described.

(a) Epoxy Resin

The epoxy resin used as the adhesive component in the present invention is a compound having at least two epoxy groups in the molecule.

As the epoxy resin, there can be used, for example, polyglycidyl ethers of polyphenols such as bisphenol A, 2,2-bis(4'-hydroxyphenyl)butane (bisphenol B), 1,1'-bis(4-hydroxyphenyl)ethane (sometimes called "bisphenol AD"), bis(4-hydroxyphenyl)methane (bisphenol F), 1,1,2,2-tetrakis(4-hydroxyphenyl) -hydroxy phenyl ether and p-(4-hydroxy)phenol, polyglycidyl ethers or neuclear hydrogenation products of the above-mentioned polyphenols, polyglycidyl ethers of polyhydric phenols such as catechol, resorcinol, hydroquinone and phloroglucinol, polyglycidyl ethers of polyhydric alcohols such as ethylene glycol, butane-diol, glycerol, erythritol and polyoxy-alkylene glycol, novolak epoxy resins, alicyclic epoxy resins such as vinylcyclohexene dioxide, limonene dioxide and dicyclopentadiene dioxide, polyglycidyl esters of ester condensates or polycarboxylic acids such as phthalic acid and cyclohexane-1,2-dicarboxylic acid, polyglycidylamine epoxy resins, and methylepicro epoxy resins.

In the present invention, these epoxy resins can be used singly or in the form of mixtures of two or more of them. Of these epoxy resins, glycidyl ethers of polyphenols and novolak type epoxy resins are preferred, and epoxy resins which are liquid at room temperature (for example, 15°–25° C.) are especially preferred from the viewpoint of the operation adaptability.

(b) Vinyl Chloride Copolymer Resin

In the present invention, the vinyl chloride copolymer resin (b) is used for increasing the affinity of the epoxy resin (a) with the vinyl halide type resin as the adherend.

This vinyl chloride copolymer resin is dissolved in the epoxy resin (a) before incorporation of the curing agent component (c).

It is preferred that an appropriate type of the vinyl chloride copolymer resin (b) be selected and used according to the kind of the curing agent component (c). For example, if an aliphatic polyamine having a plurality or ether bonds is used as the curing agent component (c), in view of the compatibility with the epoxy resin, a vinyl chloride copolymer resin having an average polymerization degree of 250 to 600, especially 300 to 500, is preferred, and a vinyl chloride/vinyl acetate copolymer or a vinyl chloride/vinyl acetate/vinyl alcohol terpolymer formed by partially saponifying the above copolymer (vinyl chloride/ vinylacetate copolymer) is especially preferably used.

As the vinyl chloride/vinyl acetate copolymer, a copolymer having a vinyl acetate content of 18 to 45% by weight, especially 25 to 40% by weight, is preferably used, and as the terpolymer, a terpolymer having a vinyl acetate content of 1 to 10% by weight, especially 2 to 8% by weight, and a vinyl alcohol content or 1 to 10% by weight, especially 3 to 8% by weight, is preferably used.

The vinyl chloride copolymer resin or this type is used in an amount of 1 to 50 parts by weight, especially 3 to 35 parts by weight, per 100 parts by weight of the epoxy resin (a).

If the amount incorporated of the vinyl chloride copolymer resin is within the above-mentioned range, extreme increase of the viscosity of the obtained adhesive composition can be prevented, and the operation adaptability and adhesiveness are good.

Incidentally, as the vinyl acetate content is high in the vinyl chloride copolymer of this type, even if the copolymer is incorporated in a large amount, increase or the viscosity is controlled.

In the case where an alicyclic polyamine or an alkylene diamine is used as the curing agent component (c), a terpolymer comprising vinyl chloride, vinyl acetate and an unsaturated carboxylic acid or an anhydride thereof is preferably used as the vinyl chloride copolymer resin (b).

In view of the compatibility with the epoxy resin (a) and the affinity with the vinyl halide type resin, it is preferred that the average polymerization degree or the terpolymer resin be 200 to 800, especially 300 to 600, and that the vinyl acetate content be 2 to 25% by weight, especially 4 to 20% by weight, and the unsaturated carboxylic acid content be 0.1 to 10% by weight, especially 0.5 to 7% by weight.

As the unsaturated carboxylic acid or its anhydride as the comonomer, there can be mentioned unsaturated carboxylic acids such as acrylic acid, methacrylic acid, maleic acid, fumaric acid, itaconic acid, citraconic acid, tetrahydrophthalic acid and bicyclo{2,2,1}hepto-2-ene-5,6-dicarboxylic acid, and unsaturated carboxylic anhydrides such as maleic anhydride, itaconic anhydride, citraconic anhydride, tetrahydrophthalic anhydride and bicyclo{2,2,1}hepto-2-ene-5,6-dicarboxylic anhydride. Maleic anhydride, acrylic acid and methacrylic acid are especially preferred.

In the present invention, the terpolymer of this type is used in an amount of 0.5 to 40 parts by weight, especially 1.0 to 35.0 parts by weight, per 100 parts by weight of the epoxy resin as the component (a).

If the amount incorporated of the terpolymer is within the above-mentioned range, extreme increase of the viscosity of the obtained adhesive composition can be prevented, and the operation adaptability is good and the bonding strength is improved.

(c) Curing Agent Component

An aliphatic polyamine having a plurality or ether bonds, an alicyclic polyamine or an alkylene diamine is used as the curing agent component (c) in the present invention.

(c-1) Aliphatic Polyamine

As specific examples of the aliphatic polyamine having a plurality of ether bonds, that can be used as the curing agent component (c) in the present invention, there can be mentioned a diamine represented by the Following general formula:

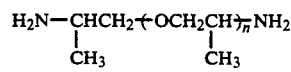

wherein n is a number or from 2 to 8, (the polyamine of this type is marketed, for example, under the tradename of "Jeffamine D" by Texaco Chemical), a polyamine represented by the Following general formula:

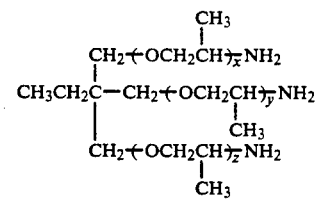

wherein x, y and z stand for a number of from 0 to 8, with the proviso that they satisfy the requirement of $3 \leq x+y+z \leq 8$, (the polyamine of this type is marketed, for example, under the tradename of "Jeffamine T" by Texaco Chemical), and a polyamine represented by the following general wherein m and n stand for a number of from 2 to 5,

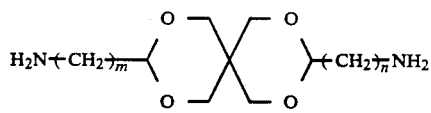

wherein m and n stand for a number of from 2 to 5, such as 3,9-bis(3-aminopropyl)-2,4,8,10-tetraoxaspiro-{5,5}-undecane (the polyamine of this type is marketed, for example, under the tradename of "Epomate B" by Yuka-Shell Epoxy).

Some of the foregoing polyamines are solid at room temperature and are not suitable for use as a curing agent for an adhesive. These polyamines can be used after they are liquefied or the reactivity is adjusted by preliminary modification with a small amount of a mono- or di-glycidyl ether compound, acrylonitrile or phenol/formalin.

For example, 3,9-bis(3-aminopropyl)-2,4,8,10-tetraoxaspiro{5,5}undecane is used after partial modification with butylglycidyl ether.

(c-2) Alicyclic Polyamine

An alicyclic polyamine having 1 to 3 rings is preferably used, and the ring structure may be a monocyclic structure, a bicyclic structure or a spiro ring structure. Moreover, the ring may be a hetero-ring containing atoms other than carbon, for example, nitrogen, oxygen or sulfur.

It is indispensable that the amino group contained in the alicyclic polyamine should be a primary or secondary amino group, and an alicyclic polyamine containing only a primary amino group and an alicyclic polyamine containing a primary amino group and a secondary amino group are preferred. An alicyclic polyamine containing a tertiary amino group alone is not suitable.

As examples or the alicyclic polyamine that can be used, there can be mentioned

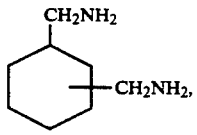

isophorone diamine, menthene diamine,

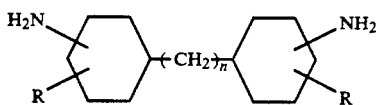

wherein n is a number or from 0 to 6 and R stands for H, $CH_3$, $C_2H_5$ or Cl, N-aminoethylpiperazine, 3,9-bis(3-aminopropyl)-2,4,8,10-tetraoxaspiro{5,5}-undecane, a diamine having a tricyclodecane skeletone, such as

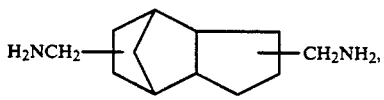

and a polyamide-amine obtained by subjecting a dimer acid (obtained by the Diels-Alder reaction of an unsaturated fatty acid composed mainly of linoleic acid or oleic acid; the main component containing a cyclohexene ring is an unsaturated carboxylic acid having 36 carbon atoms) to dehydration condensation with diethylenetriamine or triethylene tetraamine.

Some of the above-mentioned alicyclic polyamines, especially alicyclic polyamines having a plurality of primary amino groups, are solid at room temperature and are not suitable for use as an curing agent for an adhesive. As described hereinbefore with respect to the aliphatic polyamine (c-1), these alicyclic polyamines can be used after they are liquefied or the reactivity is adjusted by preliminary modification with a small amount of a mono- or di-glycidyl ether compound, acrylonitrile or phenol/formalin.

(c-3) Alkylene Diamine

As the alkylene diamine, there can be used compounds represented by the following general formula:

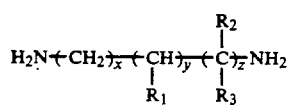

where $R_1$, $R_2$ and $R_3$ stand for a hydrogen atom, a methyl group, an ethyl group or a halogen atom, and x, y and z stand for a number of from 0 to 12, with the proviso that the sum $(x+y+z)$ is in the range of from 2 to 12, such as ethylene diamine, propylene diamine and 1,6-diamino-2,2,4-trimethylhexane.

In general, the curing agent component (e) is incorporated in such an amount that the amount of primary and secondary amino groups is stoichiometrically equivalent to the amount of glycidyl groups in the epoxy resin (a). Namely, the curing agent component (c) is ordinarily incorporated in an amount represented by the following formula:

$$0.7 \leq \frac{2 \times \text{mole number of primary amino groups} + \text{mole number of secondary amino group in the component } (c)}{\text{amount (moles) of glycidyl groups in component } (a)} \leq 1.3$$

In the present invention, by using the above-mentioned curing agent component (c) in combination with the epoxy resin component (a) and the component (b), an adhesive composition having an excellent adhesiveness to a vinyl halide type resin is obtained.

For example, the T-peel bonding strength of a bonded sheet obtained by applying the adhesive of the present invention comprising a polyamine having a plurality or ether bonds as the curing agent component (c) to a rigid vinyl chloride resin sheet is at least 1.2 kgf/em (Examples 13 through 17), while a T-peel bonding strength of about 0.1 to about 0.3 kgf/cm is attained when an adhesive composition comprising a polyamine free of an ether bond as the curing agent is used (Comparative Examples 2 through 5).

Other Additives

Known additives can be added to the adhesive composition of the present invention in addition to the components (a) through (c).

For example, a stabilizer for a vinyl chloride resin, such as an organic acid metal salt, lead sulfate or an organic tin salt, an antistatic agent such as a surface active agent, electroconductive carbon or a boron type antistatic agent, a flow modifier such as aerosil, a bentonite, a bisamide, a wax or an organic acid salt type thixotropic agent, and a silicon or titanium type coupling agent can be incorporated, so far as characteristics such as the adhesiveness are not degraded.

Moreover, a known filler or reinforcer can be incorporated.

For example, inorganic fillers such as silica, calcium carbonate, talc, alumina, aluminum hydroxide, magnesium hydroxide, iron oxide, magnesium oxide, magnesium silicate, aluminum silicate, mica, barium sulfate, carbon black, graphite and asbestos, powders and flakes of metals such as aluminum, copper, silver, nickel, chromium and stainless steel, and glass fibers, ceramic fibers such as alumina fibers and zirconia fibers, carbon fibers, aramid fibers and metal fibers can be incorporated.

PREPARATION OF ADHESIVE COMPOSITION

The adhesive composition of the present invention can be obtained by dissolving the vinyl chloride copolymer (b) in the epoxy resin (a), ordinarily at an elevated temperature of 80 to 150° C., and cooling the solution to normal temperature and adding the curing agent component (c).

When the vinyl chloride copolymer resin (b) is dissolved under heating in the epoxy resin (a), it sometimes happens that the viscosity of the mixture drastically increases and the operation adaptability is degraded.

In this case, this disadvantage can be avoided, for example, by incorporating an epoxy type diluent having a viscosity lower than 1000 cps at 25° C. in an amount or 5 to 100 parts by weight per 100 parts by weight or the epoxy resin.

As the diluent, there can be mentioned, for example, polyethylene glycol diglycidyl ether

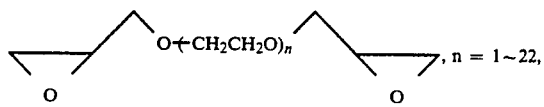

polypropylene glycol diglycidyl ether

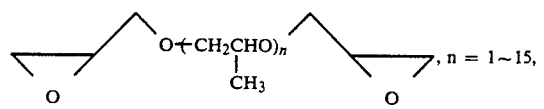

polytetramethylene glycol diglycidyl ether

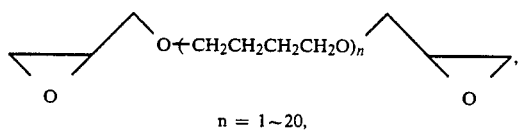

neopentyl glycol diglycidyl ether, 1,6-hexane-diol glycidyl ether, 2-ethylhexyl diglycidyl ether, trimethylolpropane di- or tri-glycidyl ether, glycerol di- or tri-glycidyl ether, a monoglycidyl ether of an alcohol

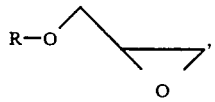

R=alkyl group having 4 to 18 carbon atoms, a monoglycidyl ether of phenol or a derivative

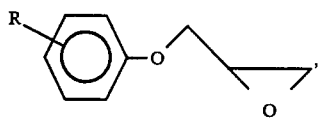

R=H or alkylgroup having 1 to 18 carbon atoms, a monoglycidyl ester of a carboxylic acid

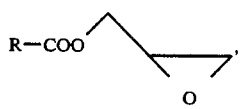

R=alkyl group having 4 to 18 carbon atoms,. and an N,N′-diglycidylaniline derivative

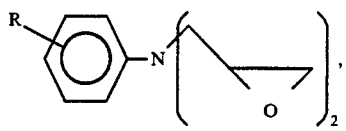

R=H or alkyl group having 1 to 8 carbon atoms.

The diluent is ordinarily incorporated in an amount of 5 to 100 parts by weight per 100 parts by weight or the epoxy resin.

An epoxy type diluent having a viscosity lower than 1000 cps at 25° C. is preferably used. In general, a diluent having a lower molecular weight shows a higher diluting effect, and a diluent having a higher molecular weight makes a contribution to improvement of the bonding strength though the diluting effect is not so high.

Additives used according to need can be incorporated simultaneously with or prior to the heat dissolution of the component (b), or they can be added simultaneously with the curing agent component (c) or at any other optional stage.

As is apparent from the foregoing description, according to the present invention, an adhesive composition having a good adhesiveness to a vinyl halide type resin such as a vinyl chloride resin, a vinylidene chloride resin or a copolymer resin thereof can be obtained without using any solvent at all.

Furthermore, the adhesive composition of the present invention can be cured at a very low temperature, for example, at a temperature lower than the glass transition point (Tg) of a rigid vinyl chloride resin, and therefore, the adhesive composition of the present invention is advantageous in that thermal deformation of a rigid vinyl chloride resin can be effectively prevented at the bonding operation.

The adhesive composition of the present invention is effectively used in the solvent-free state as the adhesive for a molded body or a vinyl chloride resin or vinylidene chloride resin. However, needless to say, the adhesive composition of the present invention can be used in the state diluted with an aromatic solvent such as toluene or xylene, a cellosolve solvent or a ketone type solvent according to the intended use or the like.

The present invention will now be described in detail with reference to the following examples. Incidentally, Examples 1 through 17 relate to an embodiment where an aliphatic polyamine (c-1) having a plurality or ether bonds is used as the curing agent component (c), Examples 18 through 42 relate to an embodiment where an alicyclic polyamine (c-2) is used as the curing agent component (c), and Examples 43 through 44 relate to an embodiment where an alkylene diamine (c-3) is us d as the curing agent component (c).

EXAMPLES 1 THROUGH 9 AND COMPARATIVE EXAMPLE 1

A separable flask having a capacity of 200 cm was charged with 70.0 g of a bisphenol AD type epoxy resin (epoxy equivalent=173, viscosity=3000cps at 25° C.), 30.0 g of polypropylene glycol diglycidyl ether (epoxy equivalent=309, viscosity=150 cps at 25° C., Epolite 400P supplied by Kyoei Yushi) as the diluent and a predetermined amount (shown in Table 1) of a vinyl chloride/vinyl acetate copolymer resin (vinyl acetate content=32% by weight, average polymerization degree 400, Denka Vinyl 1000D supplied by Denki Kagaku Kogyo), and the mixture was stirred in an oil bath maintained at 135° C. to form a solution. Thus, 9 samples shown in Table 1 were prepared (Examples 1 through 9).

For comparison, a sample was prepared without incorporating the vinyl chloride/vinyl acetate copolymer resin (Comparative Example 1).

The obtained bonded sheet was cut into a width of 1.0 cm and the T-peel bonding strength was measured by a tensile tester.

The measurement was carried at 21° C. and a pulling speed of 50 mm/min. With respect to each sample, the measurement was conducted three times and the mean value was calculated.

The obtained results are shown in Table 1.

TABLE 1

| | Components (g) epoxy resin Bisphenol AD type | Epolite 400P (diluent) | vinyl chloride/ vinyl acetate copolymer resin | curing agent | T-Peel Bonding Strength (kgf/cm) |
| --- | --- | --- | --- | --- | --- |
| Example 1 | 70 | 30 | 5.0 | 37.4 | 0.7 |
| Example 2 | 70 | 30 | 10.0 | 37.4 | 1.3 |
| Example 3 | 70 | 30 | 15.0 | 37.4 | 1.6 |
| Example 4 | 70 | 30 | 20.0 | 37.4 | 2.1 |
| Example 5 | 70 | 30 | 25.0 | 37.4 | 2.4 |
| Example 6 | 70 | 30 | 30.6 | 37.4 | 3.3 |
| Example 7 | 70 | 30 | 35.0 | 37.4 | 3.6 |
| Example 8 | 70 | 30 | 40.0 | 37.4 | 3.6 |
| Example 9 | 70 | 30 | 45.0 | 37.4 | 3.7 |
| Comparative Example 1 | 70 | 30 | 0 | 37.4 | 0.1 |

Each of the so-prepared 10 samples was cooled to room temperature and 37.4 g of a curing agent shown below was added to form an adhesive composition.

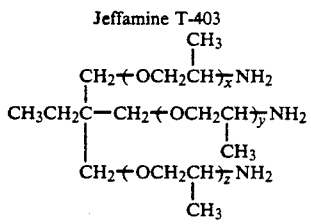

Jeffamine T-403

$x+y+z=5.3$ viscosity = 21 cps at 25° C.

Each adhesive composition was coated in a thickness of 12.5 μm on a white opaque rigid polyvinyl chloride sheet (length = 12 cm, width = 7 cm, thickness = 0.28 mm), used for a telephone card, a cash card, an IC card and the like, by using a bar coater.

The adhesive composition was removed from the peripheral side of the rigid polyvinyl chloride sheet along a width of 4 mm, and a Mylar film having a thickness or 12.5 μm was placed on this part as a spacer.

A rigid polyvinyl chloride sheet of the same kind not coated with the adhesive was piled on the above sheet, and heat-curing was carried out at 85° C. (pressure = 20 g/cm²) for 70 minutes.

EXAMPLES 10 THROUGH 12

In the same manner as described in Examples 1 through 9, predetermined three samples were prepared by heat-dissolving 68.5 g of a bisphenol F type epoxy resin (epoxy equivalent = 174, viscosity = 3610 cps at 25° C., Epiclon 830 supplied by Dai-Nippon Ink Kagaku Kogyo), 21.5 g of polypropylene glycol diglycidyl ether (epoxy equivalent = 309, viscosity = 150 cps at 25° C. Epolite 400 P supplied by Kyoei Yushi) as the diluent, 10.0 g of ethylene glycol diglycidyl ether (epoxy equivalent = 135, viscosity = 25 cps at 25° C., Epolite 40E supplied by Kyoei Yushi) and 15.0 g of a vinyl chloride copolymer resin (supplied by Denki Kagaku Kogyo, shown in Table 2) and cooling the solution to room temperature. Namely, these five samples were the same except the kind of the vinyl chloride copolymer resin.

Each of these samples was mixed with 40.5 g of the same curing agent (Jeffamine T-403) as used in Examples 1 through 9 to form an adhesive composition. The T-peel bonding strength was measured in the same manner as described in Examples 1 through 9.

The kinds of the vinyl chloride copolymer resin and the test results are shown in Table 2.

TABLE 2

| | Comonomers in Vinyl Chloride Copolymer Resin (trade mark) | Average Polymerization Degree | Composition* (weight ratio) | T-Peel Bonding Strength (kgf/cm) |
| --- | --- | --- | --- | --- |
| Example 10 | vinyl chloride/vinyl acetate (Denka Vinyl 1000 D) | 400 | C/A = 68/32 | 2.0 |
| Example 11 | vinyl chloride/vinyl acetate vinyl alcohol (Denka Vinyl 1000 GSK) | 340 | C/A/V = 91/3/6 | 2.5 |
| Example 12 | vinyl chloride/vinyl acetate/ vinyl alcohol (Denka Vinyl 1000 GKT) | 420 | C/A/V = 91/3/6 | 3.5 |

Note
*: C: vinyl chloride unit, A: vinyl acetate unit, V: vinyl alcohol unit

EXAMPLE 13

In the same manner as described in Examples 1 through 9, a sample was prepared by using 60.0 g of Epiclon 830 (epoxy resin), 25.0 g of Epolite 400P (epoxy resin), 15.0 g of Epolite 40E (diluent) and 15.0 g of Denka Vinyl 1000 GSK (vinyl chloride copolymer resin). An adhesive composition was prepared by adding 50 g of the following curing agent to the obtained sample. Epomate B-002 (Yuka-Shell Epoxy), which is a monoglycidyl ether modification product of the following compound:

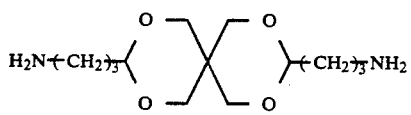

The T-peel bonding strength determined with respect to this composition was 2.4 kgf/cm (curing conditions: 70 minutes and 85° C.).

EXAMPLE 14

An adhesive composition was prepared in the same manner as described in Example 13 except that 55.4 g of Jeffamine D-400 (supplied by Texaco Chemical), represented by the following formula:

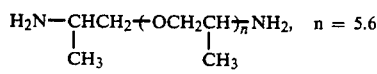

was used as the curing agent.

The T-peel bonding strength determined with respect to the obtained adhesive composition was 1.2 kgf/cm (curing conditions: 180 minutes and 85° C.).

EXAMPLE 15

A sample was prepared from 70.0 g of Epomik R-710 (epoxy resin), 30.0 g or Epolite 400P (epoxy resin) and 25.0 g or Denka Vinyl 1000D (vinyl chloride/vinyl acetate copolymer resin), and an adhesive composition was prepared by adding 51.4 g of Jeffamine D-230 (curing agent) to the sample. The procedures were the same as described in Example 14.

The T-peel strength determined with respect to this adhesive composition was 2.1 kgf/cm (curing conditions: 180 minutes and 85° C.).

EXAMPLE 16

An adhesive composition was prepared in the same manner as described in Example 15 except that a sample was prepared by using 70.0 g of Epomik R-710 (epoxy resin), 30.0 g of Epolite 400P (epoxy resin) and 15.0 g of Denka Vinyl GKT (vinyl chloride terpolymer resin).

The T-peel bonding strength determined with respect to this adhesive composition was 1.6 kgf/cm (curing conditions: 180 minutes, 85° C.).

EXAMPLE 17

An adhesive composition was prepared in the same manner as described in Example 15 except that 30.0 g of Jeffamine D-230 (supplied by Texaco Chemical) represented by the following formula was incorporated as the curing agent:

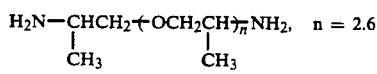

The T-peel strength determined with respect to this adhesive composition was 1.5 kgf/cm (curing conditions: 70 minutes and 85° C.).

COMPARATIVE EXAMPLE 2

An adhesive composition was prepared in the same manner as described in Example 15 except that 29.3 g of Laromin C (supplied by BASF) represented by the following formula was incorporated as the curing agent:

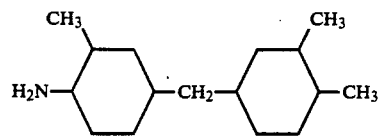

The T-peel bonding strength determined with respect to this adhesive composition was 0.3 kgf/cm (curing conditions: 180 minutes and 85° C.).

COMPARATIVE EXAMPLE 3

An adhesive composition was prepared in the same manner as described in Example 15 except that 12.0 g or triethylene tetramine (supplied by Toyo Soda) was incorporated as the curing agent.

The T-peel bonding strength determined with respect to this adhesive composition was 0.1 kgf/cm (curing conditions: 70 minutes, 85° C.).

COMPARATIVE EXAMPLE 4

An adhesive composition was prepared in the same manner as described in Example 15 except that 13.3 g of tetraethylene pentamine (supplied by Toyo Soda) was used as the curing agent.

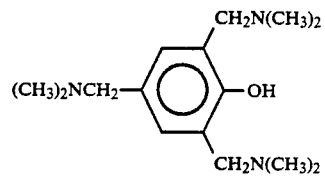

The T-peel bonding strength determined with respect to this adhesive composition was 0.2 kgf/cm (curing conditions: 70 minutes and 85° C.).

COMPARATIVE EXAMPLE 5

An adhesive composition was prepared in the same manner as described in Example 13 except that 7.0 g or DMP-30 (supplied by Rohm & Hass) represented by the following Formula was incorporated as the curing agent:

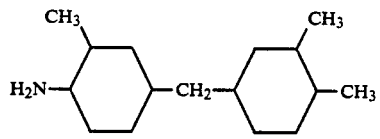

The T-peel bonding strength determined with respect to this adhesive composition was 0.2 kgf/cm (curing conditions: 70 minutes and 85° C.).

EXAMPLES 18 THROUGH 29 AND COMPARATIVE EXAMPLE 6

A bisphenol AD type epoxy resin (epoxy equivalent=173, viscosity=3000 cps at 25° C.) was used as the epoxy resin and polypropylene glycol diglycidyl ether (epoxy equivalent=309, viscosity=150 cps at 25° C., Epolite 400P supplied by Kyoeisha Yushi) was used as the diluent, and as the vinyl chloride terpolymer resin, there was used (1) a vinyl chloride/vinyl acetate/maleic anhydride copolymer resin (average polymerization degree=440, vinyl acetate content=6%, maleic anhydride content=4%, Geon 400X110A supplied by Japanese Geon) or (2) a vinyl chloride/vinyl acetate/maleic anhydride copolymer resin (average polymerization degree=330, vinyl acetate content=13%, maleic anhydride content=1%, Denka Vinyl CS supplied by Denki Kagaku Kogyo).

These components were charged in amounts shown in Table 3 in a separable flask having a capacity of 200 cm³, and they were dissolved with stirring in an oil bath maintained at 135° C. The solution was cooled to room temperature to form a sample composition of the main components.

The comparison, a sample was similarly prepared without incorporating the vinyl chloride terpolymer resin.

An adhesive composition was prepared by adding as the curing agent component a butylglycidyl ether modification product of 3,9-bis(3-aminopropyl)-2,4,8,10-tetraoxaspiro{5,5}-undecane (active hydrogen equivalent=95, viscosity=3000 cps at 25° C.).

With respect to each adhesive composition, the T-peel bonding strength was determined in the same manner as described in Example 1.

The measurement results are shown in Table 3.

TABLE 3

|  | Main Components (g) | | | Curing Agent[3] (g) | T-Peel Bonding Strength (kgf/cm) |
|---|---|---|---|---|---|
|  | Bisphenol AD type epoxy resin (g) | diluent[1] (g) | vinyl chloride/vinyl acetate/ maleic unhydride copolymer resin[2] (g) |  |  |
| Example 18 | 70.0 | 30.0 | 0.63 | 50.0 | 1.2 |
| Example 19 | 70.0 | 30.0 | 1.3 | 50.0 | 1.6 |
| Example 20 | 70.0 | 30.0 | 2.5 | 50.0 | 3.5 |
| Example 21 | 70.0 | 30.0 | 5.0 | 50.0 | 3.0 |
| Example 22 | 70.0 | 30.0 | 10.0 | 50.0 | 2.5 |
| Example 23 | 70.0 | 30.0 | 5.0* | 50.0 | 1.2 |
| Example 24 | 70.0 | 30.0 | 10.0* | 50.0 | 3.9 |
| Example 25 | 70.0 | 30.0 | 15.0* | 50.0 | 3.6 |
| Example 26 | 70.0 | 30.0 | 20.0* | 50.0 | 3.5 |
| Example 27 | 70.0 | 30.0 | 25.0* | 50.0 | 3.6 |
| Example 28 | 70.0 | 30.0 | 30.0* | 50.0 | 3.5 |
| Example 29 | 70.0 | 30.0 | 40.0* | 50.0 | 3.8 |
| Comparative Example 6 | 70.0 | 30.0 | — | 50.0 | 0.1 |

Note
[1] Polypropylene glycol diglycidyl ether
[2] In Examples 18 through 22, the vinyl acetate content was 6%, maleic anhydride content was 4% and average polymerization degree was 400, and in Examples 23 through 29, the vinyl acetate content was 13%, the maleic anhydride content was 1% and the average polymerization degree was 330
[3] Butylglycidyl modification product of 3,9-bis(3-aminopropyl)-2,4,8,10-tetraoxaspiro[5,5]-undecane

EXAMPLES 30 THROUGH 35

By using the same curing agent as used in Examples 18 through 29, adhesive compositions were prepared in the same manner as described in Examples 18 through 29 except that the main components were changed as shown in Table 4. The T-peel bonding strength was determined in the same manner as described in Examples 18 through 29.

The obtained results are shown in Table 4.

TABLE 4

|  | Main Components | | | Curing Agent (g) | T-Peel Bonding Strength (kgf/cm) |
|---|---|---|---|---|---|
| Example 30 | bisphenol A type epoxy resin (epoxy equivalent = 187, viscosity 14000 cps), 70.0 g | neopentylglycol diglycidyl ether (epoxy equivalent = 140, voscosity = 12 cps), 30.0 g | vinyl chloride copolymer resin (vinyl acetate content = 13%, maleic anhydride content = 1%, average polymerization degree = 400 ), 10.0 g | 55.4 | 2.8 |
| Example 31 | bisphenol A type epoxy resin (epoxy equivalent = 187, viscosity 14000 cps), 70.0 g | polypropylene glycol diglycidyl ether (epoxy equivalent = 309, viscosity = 150 cps), 30.0 g | vinyl chloride copolymer resin (vinyl acetate content = 6%, maleic unhydride content = 4%, average polymerization degree = 400), 5.0 g | 44.2 | 3.5 |
| Example 32 | bisphenol F type epoxy resin (epoxy equivalent = 174, viscosity 3610 cps), 70.0 g | polypropylene glycol diglycidyl ether (epoxy equivalent = 309, viscosity = 150 cps), 30.0 g | same as in Example 30, 10.0 g | 47.8 | 3.8 |
| Example 33 | bisphenol F type epoxy resin (epoxy equivalent = 174, viscosity 3610 cps), 70.0 g | polyethylene glycol diglycidyl ether (epoxy equivalent = 276, viscosity = 71 cps), 30.0 g | same as in Example 31, 5.0 g | 48.8 | 2.6 |
| Example 34 | bisphenol F type epoxy resin (epoxy equivalent = 174, viscosity 3610 | 1,6-hexane-diol diglycidyl ether (epoxy equivalent = 150, viscosity 20 | same as in Example 30, 10.0 g | 57.4 | 4.2 |

TABLE 4-continued

|  | Main Components | | Curing Agent (g) | T-Peel Bonding Strength (kgf/cm) |
|---|---|---|---|---|
| Example 35 | cps), 70.0 g bisphenol AD type epoxy resin (epoxy equivalent = 173, viscosity = 3000 cps), 70.0 G | cps), 30.0 g trimethylolpropane triglycidyl ether (epoxy equivalent = 150, viscosity = 130 cps), 30.0 g | same as in Example 30, 10.0 g | 57.4 | 3.5 |

Note
The viscosity is one determined at 25° C.

EXAMPLES 36 THROUGH 44 AND COMPARATIVE EXAMPLES 7 THROUGH 11

Adhesive compositions were prepared by incorporating a curing agent shown in Table 5 into the main components used in Example 21, that is 70.0 g or a bisphenol AD type epoxy resin, 30.0 g of polypropylene glycol diglycidyl ether and 5.0 g of a vinyl chloride/vinyl acetate/maleic anhydride copolymer resin (vinyl acetate content=6%, maleic anhydride content=4%, average polymerization degree=400). The T-peel bonding strength was determined in the same manner as described in Example 21.

The kinds of the curing agent used and the measurement results are shown in Table 5.

TABLE 5

| | Curing Agent | Structure of Curing Agent | Amount* (g) of Curing Agent | Curing Conditions | T-Peel Bonding Strength (kgf/cm) |
|---|---|---|---|---|---|
| Example 36 | Laromin C | H₂N—[cyclohexyl(CH₃)]—CH₂—[cyclohexyl(CH₃)]—NH₂ | 29.3 | 85° C. 300 minutes | 2.7 |
| Example 37 | Wandamin HM** | H₂N—[cyclohexyl]—CH₂—[cyclohexyl]—NH₂ | 25.9 | 85° C. 120 minutes | 4.0 |
| Example 38 | isophorone diamine | [cyclohexyl with NH₂, H₃C, CH₃, H₃C, CH₃] | 21.0 | 85° C. 180 minutes | 4.5 |
| Example 39 | TCD Diamine | H₂NH₂C—[tricyclic structure]—CH₂NH₂ | 23.9 | 85° C. 120 minutes | 4.5 |
| Example 40 | Versamid 140 | polyamide-amine derived from dimer acid having cyclohexene ring | 50.0 | 85° C. 75 minutes | 3.2 |
| Example 41 | 1,3-BAC | H₂NH₂C—[cyclohexyl]—CH₂NH₂ | 17.8 | 85° C. 75 minutes | 3.4 |
| Example 42 | N-AEP | HN—[piperazine]—NCH₂CH₂NH₂ | 21.5 | 85° C. 75 minutes | 2.6 |
| Comparative Example 7 | m-xylylene diamine | H₂NH₂C—[phenyl]—CH₂NH₂ | 17.1 | 85° C. 75 minutes | 0.6 |

TABLE 5-continued

| | Curing Agent | Structure of Curing Agent | Amount* (g) of Curing Agent | Curing Conditions | T-Peel Bonding Strength (kgf/cm) |
|---|---|---|---|---|---|
| Comparative Example 8 | DMP-30 | 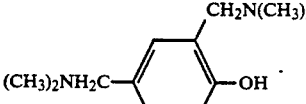 | 7.0 | 85° C. 75 minutes | 0.1 |
| Comparative Example 9 | DBU | 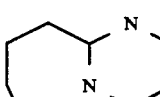 | 9.4 | 85° C. 120 minutes | below 0.1 |
| Comparative Example 10 | DDM** | 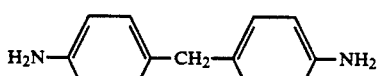 | 24.4 | 85° C. 300 minutes | 0.3 |
| Example 43 | ethylene diamine | $H_2NCH_2CH_2NH_2$ | 7.4 | 85° C. 90 minutes | 2.5 |
| Example 44 | TMHD | 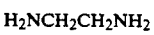 | 19.5 | 85° C. 90 minutes | 5.0 |
| Comparative | TETA | $H_2NCH_2CH_2NHCH_2CH_2NHCH_2CH_2NH_2$ | 12.0 | 85° C. 70 minutes | 0.2 |

Note
*the amoung (g) added to 105 g of the main components
**the curing agent was used after it was fused by heating because the curing agent was solid at room temperature

We claim:

1. An adhesive composition for a vinyl halide resin, which comprises (a) an epoxy resin, (b) a vinyl chloride copolymer resin and (c) an aliphatic polyamine curing agent component having a plurality of ether bonds, wherein the vinyl chloride copolymer resin (b) is a vinyl chloride/vinyl acetate/vinyl alcohol terpolymer.

2. An adhesive composition as set forth in claim 1, wherein the vinyl acetate content in the terpolymer is 1 to 10% by weight and the vinyl alcohol content in the terpolymer is 1 to 10% by weight.

3. An adhesive composition as set forth in claim 1, wherein the aliphatic polyamine (c) is a diamine compound represented by the following general formula:

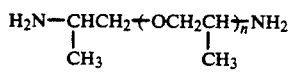

wherein n is a number of from 2 to 8.

4. An adhesive composition as set forth in claim 1, wherein the aliphatic polyamine (c) is a triamine compound represented by the following general formula:

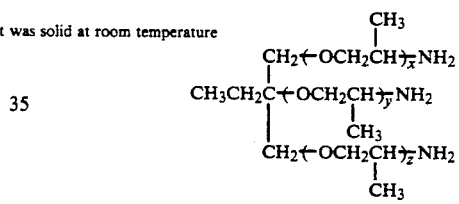

wherein x, y and z are numbers of from 0 to 8, with the proviso that they satisfy the requirement of $3 \leq x+y+z \leq 8$.

5. An adhesive composition as set forth in claim 1, wherein the aliphatic polyamine (c) is a diamine compound represented by the following general formula:

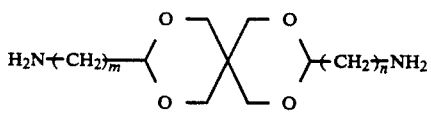

wherein m and n are numbers of from 2 to 5.

6. An adhesive composition as set forth in claim 5, wherein the aliphatic polyamine (c) is 3,9-bis(3-aminopropyl)-2,4,8,10-tetraoxaspiro{5,5}undecane.

7. An adhesive composition as set forth in claim 1, wherein the vinyl chloride copolymer resin has an average polymerization degree of 250 to 600.

8. An adhesive composition as set forth in claim 7, wherein the vinyl chloride copolymer resin has an average polymerization degree of 300 to 500.

9. A solvent-free adhesive composition for a vinyl halide resin, which comprises (a) an epoxy resin, (b) a vinyl chloride copolymer resin and (c) an aliphatic polyamine curing agent component having a plurality of ether bonds, wherein the vinyl chloride copolymer resin (b) is a vinyl chloride/vinyl acetate/vinyl alcohol terpolymer.

* * * * *